United States Patent [19]

Salmon, Jr. et al.

[11] Patent Number: 5,567,157

[45] Date of Patent: Oct. 22, 1996

[54] COMPLIANT ORTHOGONAL MOTION BASE AND SIMULATOR SYSTEM

[75] Inventors: Roland A. Salmon, Jr., Great Barrington, Mass.; James H. Payne, Woodbridge, Va.; Thomas R. Culnan, Clifton Park, N.Y.

[73] Assignee: Ridefilm Corporation, South Lee, Mass.

[21] Appl. No.: 404,721

[22] Filed: Mar. 15, 1995

[51] Int. Cl.$^6$ ................................................. G09B 9/00
[52] U.S. Cl. ................................................. 434/29
[58] Field of Search ........................ 434/29, 30, 38, 434/40, 44, 55, 58, 62, 61, 69; 472/59, 60

[56] References Cited

U.S. PATENT DOCUMENTS

| | | | |
|---|---|---|---|
| 5,433,670 | 7/1995 | Trumbull | 434/29 X |
| 5,499,920 | 3/1996 | Trumbull | 434/29 X |
| 5,509,631 | 4/1996 | De Salvo | 434/55 X |

Primary Examiner—Nicholas D. Lucchesi
Assistant Examiner—Jeffrey A. Smith
Attorney, Agent, or Firm—McCormick, Paulding & Huber

[57] ABSTRACT

A motion base for use in a simulator system is characterized by three degrees of freedom and improved compliance characteristics. The motion base has a plurality of nested perimeter frames, some of whose members attached by means of a motice and tenon design. Motion is accomplished by means of displaceable actuators arranged in a substantially orthogonal relationship with a vertical and one horizontal actuator mounted within the motion base perimeter. The actuators have either 2 DOF mounts or spherical bearings to allow for slight off axis motion relative to the frame member. The present system has compact dimensions and minimize loads impressed to motion base bearings; thereby allowing the present system to be incorporated into existing commercial structures with minimal modification.

16 Claims, 9 Drawing Sheets

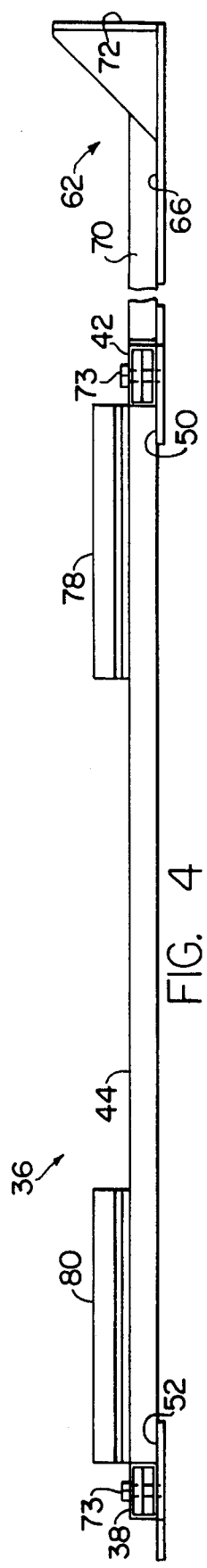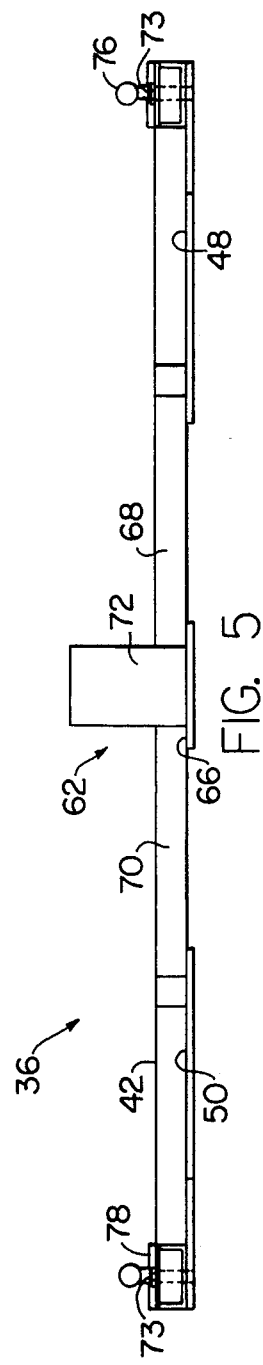

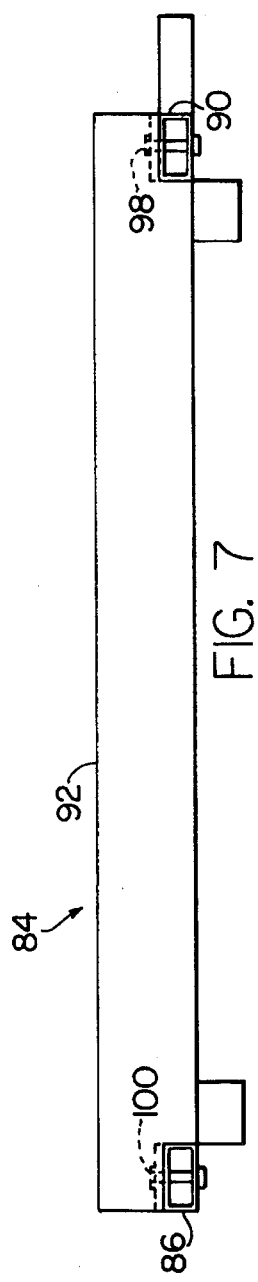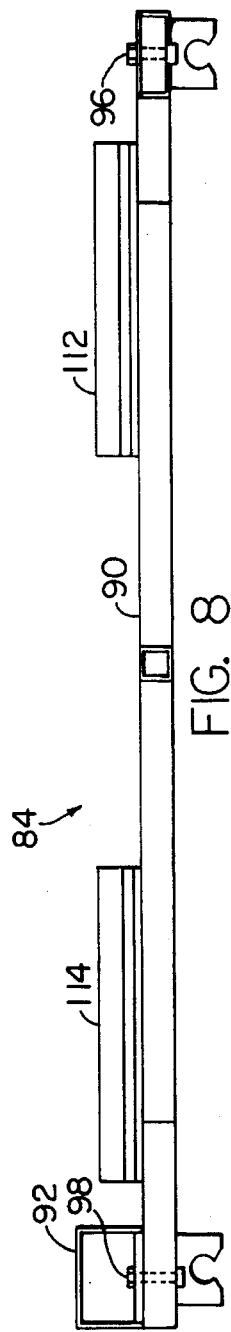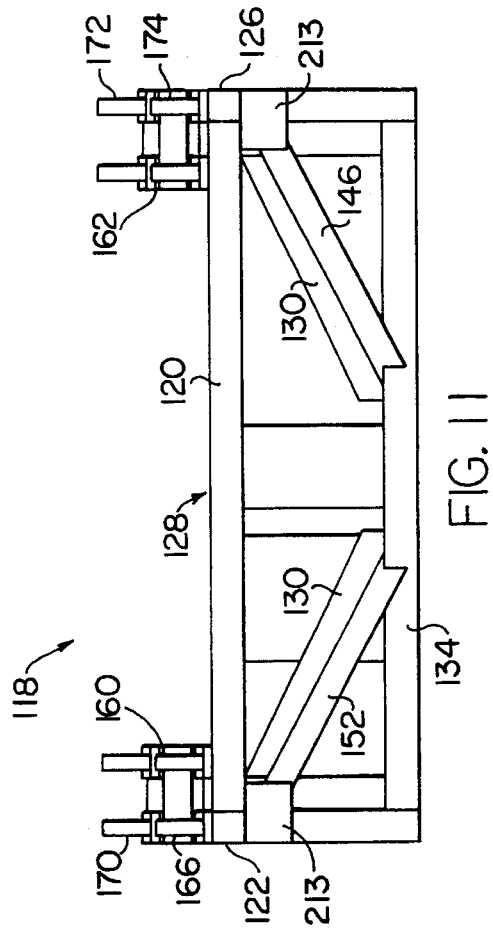

COMPLIANT ORTHOGONAL MOTION BASE AND SIMULATOR SYSTEM

TECHNICAL FIELD

The present invention relates to simulators generally and in particular to simulator system characterized by an orthogonal motion base which has improved compliance characteristics.

CROSS REFERENCE TO RELATED APPLICATION

Some of the matter contained herein is disclosed and claimed in U.S. Pat. No. 5,199,875 entitled "A Method and Apparatus for Generating Supplemental Motion in a Simulator", and U.S. patent applications Ser. No. 08/014,117 (now U.S. Pat. No. 5,527,184), Ser. No. 08/130,507 (now U.S. Pat. No. 5,509,631), and Ser. No. 08/014,330 (now U.S. Pat. No. 5,433,670), respectively entitled "A Simulator System Having An Orthogonal Motion Base", "Three Axis Motion Base Platform" and "A Compact Simulator System Theater", all of which are incorporated herein by reference.

BACKGROUND OF THE INVENTION

Simulators are well known in the art having found applications in such diverse fields as aircraft pilot training and amusement rides. In general, known simulators include a motion base having one or more seats and a plurality of programmable actuators which displace the motion base from a rest position in accordance with a predetermined sequence of drive signals. Synchronized with the motion base movement is a motion picture illuminated on a projection screen directly attached to the motion base or in the immediate environment. A controller is sometimes included to provide for the synchronization between the motion base displacements and the accompanying audio-visual work. Alternatively, the audio-visual images and motion base control signals are simultaneously recorded in media if, for example, the resultant program is to be repeatedly used.

Known simulators include the amusement ride apparatus disclosed in U.S. Pat. Nos. 4,752,065 and 4,798,376 which has a motion base that moves and tilts passengers viewing a motion picture. A plurality of passenger holding frames is provided which are all synchronously moved by separate sets of actuators. A film is shown to passengers on a stationary screen. The passenger holding frames are each pivoted up and down on a beam which is supported only by two largely vertical actuators while two pairs of links or arms limit the movement of the beam.

U.S. Pat. Nos. 3,923,300 and 3,865,430 to Tanus disclose a theater chair that comprises a support structure and a chassis having a back, arms and a seat moveably affixed to the chassis. There is a provision for movement in the vertical and horizontal directions. The Tanus chair comprises part of a overall system wherein control signal information is coded on motion picture film. The chair is operated synchronously with the playing of the motion picture to enhance the realism of the movie.

An example of a game machine is provided by U.S. Pat. No. 4,478,407 to Manabe. The '407 machine includes a motion base wherein a seat is pivotally mounted at perpendicular hinge points on a planar platform with motion in a perpendicular third dimension being accomplished by actuators configured therewith. The '407 device is designed to generate roll pitch and yaw sensations, as well as vertical movement.

A motion system for flight simulation is disclosed in U.S. Pat. No. 3,645,011 to Callanen. The '011 flight simulation system includes three spaced-apart hydraulic actuators for imparting translation to respectively associated reciprocal pistons. One of the actuators is positioned in a vertical plane containing the longitudinal or roll axis of a grounded flight trainer and the other two actuators are spaced from the roll axis at vertical positions on either side transverse to that axis.

Another amusement ride is disclosed in U.S. Pat. No. 4,066,256. The '256 amusement ride creates the illusion that the passengers are seated in a rapidly maneuvering vehicle by applying forces to the passengers in synchronism with the display of a motion picture image. The '256 apparatus includes a passenger holding frame that has three locations resting on hydraulic rams that can tilt the frame or move it up and down with a film projector and viewing screen connected to the frame to move with it.

U.S. Pat. No. 4,846,686 discloses a motor vehicle simulator with multiple images. The '686 simulator is characterized by a conventional front looking "driver point of view" image which would be seen by a driver looking through a windshield. Another section of the images displayed with the '686 simulator includes images that were recorded by one or more cameras which were facing rearward. An individual in the simulator is simultaneously presented with a forward looking "driver point of view" image and with other images representing what would be seen by the driver looking towards the rear of the simulator vehicle.

U.S. Pat. No. 4,276,030 discloses a pivotable vehicle simulator with one end of an upper frame carrying an passenger station of a simulated vehicle. The upper frame is mounted to a base frame which is pivotal about a vertical axis. A dummy steering wheel is provided at the passenger's station and is linked to pivot the upper frame. Combined rotary and translation bearings support the other end of the upper frame on a shaft carried on a base frame to accommodate the pivotal movement about the vertical axis and also to provide a small upward pitching of the upper frame during pivoting of the upper frame in either direction from a central position so that gravity acts to restore the upper frame and steering wheel to centered conditions.

Other known simulator systems rely primarily on rotational motion including the amusement apparatus of U.S. Pat. No. 5,060,932, the video simulation apparatus of U.S. Pat. No. 4,856,771 and the simulation device of U.S. Pat. No. 4,710,129. All of the above are geared towards simulating simultaneous roll, yaw and pitch or combinations thereof. Some of the above are also configured to be used with projected images for viewing by passengers as part of the simulation. The amusement ride of U.S. Pat. No. 4,066,256 is characterized by three substantially vertical hinged actuators which are moved in a controlled manner to displace a top mounted horizontal platform, thereby simulating acceleration in the plane of the platform.

Most existing motion bases are large and tall, resulting in simulator systems that will not fit in buildings of a standard design. Commercial buildings typically have a maximum height of about 14.5 ft. Known simulator systems must, therefore, be housed in specially fabricated buildings. For amusement applications, new buildings must be constructed or existing buildings must be heavily modified, adding still more costs to the simulator system. Moreover, existing orthogonal motion bases employ rigid, welded structures in an effort to maximize strength for a given displaceable weight. However, the resultant motion bases have been characterized by failed welds and very short linear bearing life.

It would be desirable to have a motion base for use in a simulator system which is simple and cost efficient to construct and has improved load distribution achieved by compliance in select frame assemblies. The present invention is drawn towards such a motion base.

SUMMARY OF THE INVENTION

An object of the present invention is to provide an orthogonal motion base for use in a simulator system that has improved compliance characteristics.

Another object of the present invention is to provide a motion base of the forgoing type having a reduced weight, thereby presenting lower kinetic loads presented to the building structure.

Yet another object of the present invention is to provide a simulator system of the foregoing type which can employ a variety of motion actuators.

According to the present invention, a motion base for use with a simulator system having a system controller that generates command signals for presentation of a sequence of audio-visual image signals to a simulator system passenger synchronously with the movement of the motion base includes a base frame fixed to provide a foundation to the room floor, the base frame having a perimeter formed by base frame members affixed to one another by means of a mortice in a first member received by a complimentary tenon in a second member, with opposed ones of said base members having substantially parallel upper surfaces. A middle frame is positioned relative to the base frame to be displaceable along a first axis. The middle frame has a perimeter formed by middle frame members affixed to one another by means of a mortice in a first member received by a complimentary tenon in a second member, with opposed ones of the middle frame members having substantially parallel upper and lower surfaces. There are cooperatively engaging base and middle displacement guide elements respectively affixed to the base frame upper surface and the middle frame lower surface for constraining the base and middle frames to linear relative movement along the first axis. A first actuator communicates with the base and middle displacement guide elements for effecting displacement of the middle frame relative to the base frame in response to received first actuator drive signals. There is an upper frame positioned relative to the middle frame to be displaceable along a second axis. The upper frame has a perimeter formed by upper frame members affixed to one another with opposed ones of the middle frame members having substantially parallel lower surfaces. The motion base also includes an actuator carriage affixed to a central region of the upper frame. An elevated stabilizer mount is affixed to the upper frame members such that stabilizer receptacles mounted on an upper stabilizer mount surface are inclined with respect to the upper frame perimeter. There are cooperatively engaging middle and upper displacement guide elements respectively affixed to the middle frame member upper surfaces and the upper frame member lower surfaces for constraining the middle and upper frames to linear relative movement along the second axis. A second actuator communicates with the middle and upper displacement guide elements for effecting displacement of the middle and upper frames relative to one another in response to received second actuator drive signals. A lift carriage is positioned relative to the upper frame to be displaceable substantially along a third axis orthogonal to both the first and second axes, and has stabilizer receptacles mounted on a lift carriage lower surface. A third actuator communicates with the upper frame and lift carriage displacement guide elements for effecting displacement of the lift carriage relative to the upper frame in response to received third actuator drive signals, with the third actuator having a first end affixed to the actuator carriage. There is also a stabilizer rotably mounted in the stabilizer receptacles for providing lateral stability to the lift carriage during displacement.

BRIEF DESCRIPTION OF THE DRAWINGS

FIG. 4 is a simplified elevational view of the base frame taken along the line A—A of FIG. 3.

FIG. 5 is a simplified elevational view of the base frame taken along the line B—B of FIG. 3.

FIG. 7 is a simplified elevational view of the middle frame taken along the line A—A of FIG. 6.

FIG. 8 is a simplified elevational view of the middle frame taken along the line B—B of FIG. 6.

FIG. 11 is a simplified elevational view of the middle frame taken along the line B—B of FIG. 9.

DESCRIPTION OF THE PREFERRED EMBODIMENT

Figure 1:
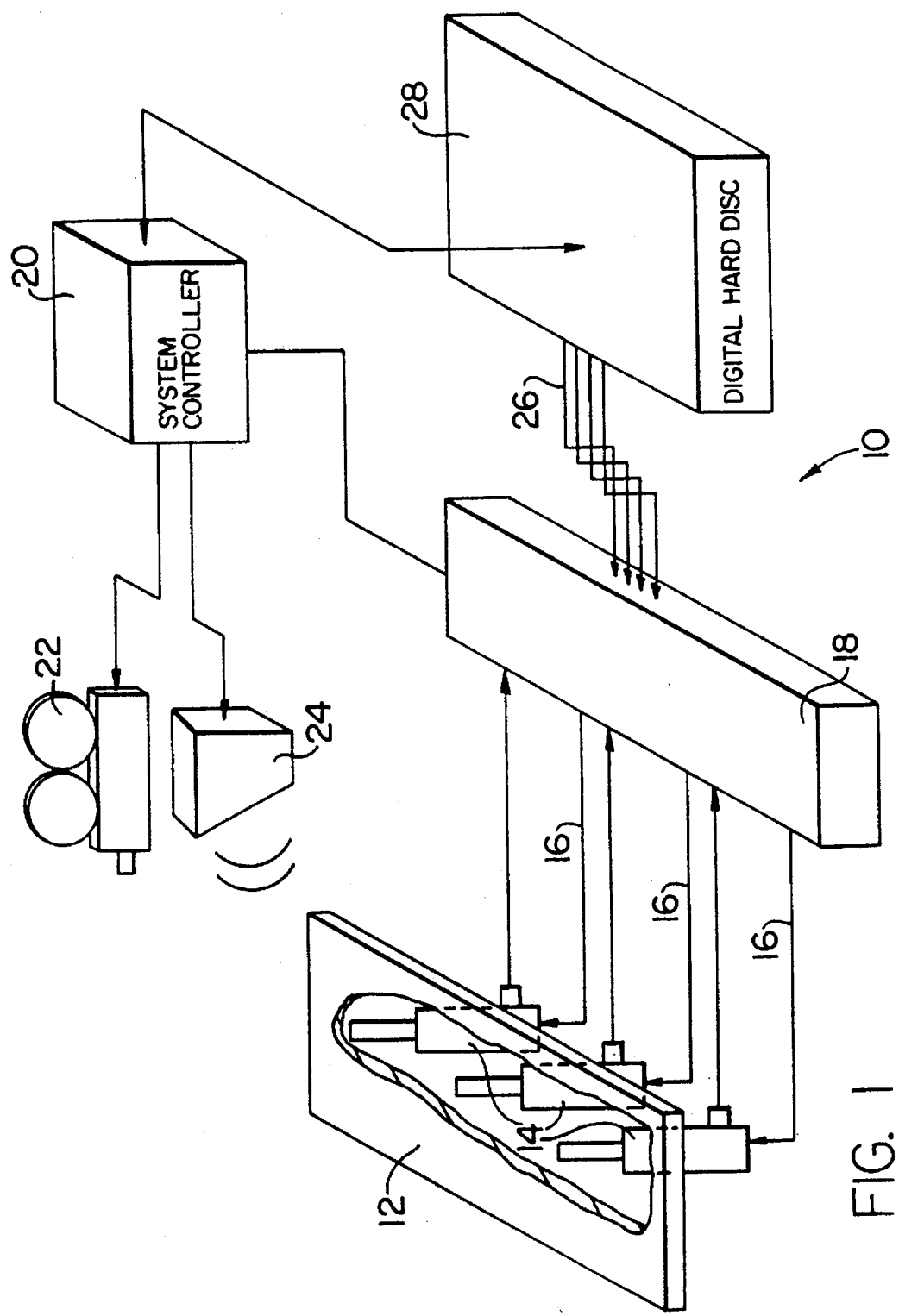
FIG. 1 is a simplified block diagram illustrating a simulator system provided with an orthogonal motion base that is in accordance with the present invention.

Referring now to FIG. 1 there is shown a block diagram illustrating a simulator system 10 provided according to the present invention. The system 10 comprises a motion base 12 which includes a plurality of actuators 14. The actuators receive drive signals on lines 16 from a motion base controller 18. The motion base includes at least one seat for a simulator system occupant.

The simulator system includes a system controller 20 that provides control signals to an audio-visual system indicated schematically by projector 22 and speaker 24 as well as a viewing screen, not shown in the Figure. Typically, the audio-visual images are encoded in a single film medium in a known manner There is no limitation as to the film format that can be used with the present invention. Command signals are provided on lines 26 from a storage medium such as a digital hard disc 28 to the motion base controller. The actuator drive signals are programmed in a manner detailed hereinafter and are configured to be synchronously applied to the motion base in accordance with the preprogrammed audio-visual images. As noted above, the motion base is preferably comprised of a plurality of hydraulic actuators each of which is respectively configured with a servo valve (not shown) for receiving drive signals to displace the actuators a selected amount at a selected rate. Both the hydraulic actuators and the servo valves are of a known type.

Figure 2:
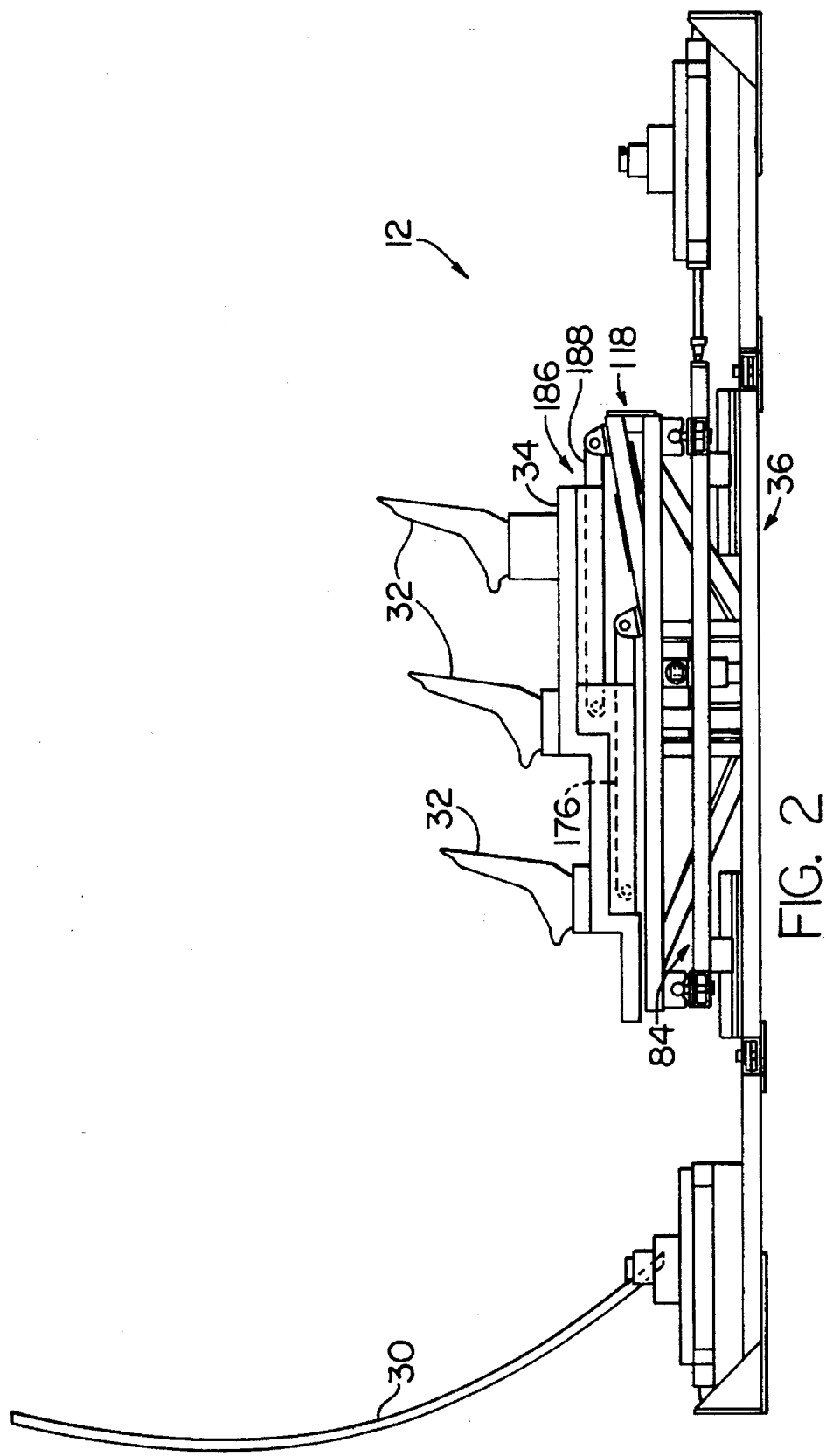
FIG. 2 is a simplified side elevational view of the motion base of FIG. 1.

FIG. 2 is a simplified schematic elevational view of a preferred embodiment of the system 10 including the orthogonal motion base 12. Screen 30 is curved, with the preferred geometry being spherical. Passengers are placed in seats 32 on a ride car or, equivalently, platform 34. The preferred motion base seats between 12 and 18 individuals. The platform is inclined towards the screen to afford each passenger an unobstructed view. Not shown in FIG. 2 is the projector positioned above the motion base.

The preferred motion base is characterized by a reduced height as compared to the prior art and by orthogonal motion in a horizontal plane, with substantially vertical motion (i.e. less than 10 degrees rotation) in the third direction. Those skilled in the art will note that other motion base configurations are encompassed by the present invention, including embodiments wherein the passenger platform is moved vertically by a rail or rack and pinion mechanism or by a cantilever mechanism.

The motion base of the preferred embodiment is simple and light-weight to reduce construction and maintenance costs. The motion base is comprised of a series of perimeter frames and carriages that are configured to move along a respective single axis such that rotational motions along yaw, pitch and roll rotational axes are almost completely avoided. The present motion base is limited almost entirely to three degrees of freedom, the classic x, y and z orthogonal axes.

Figure 3:
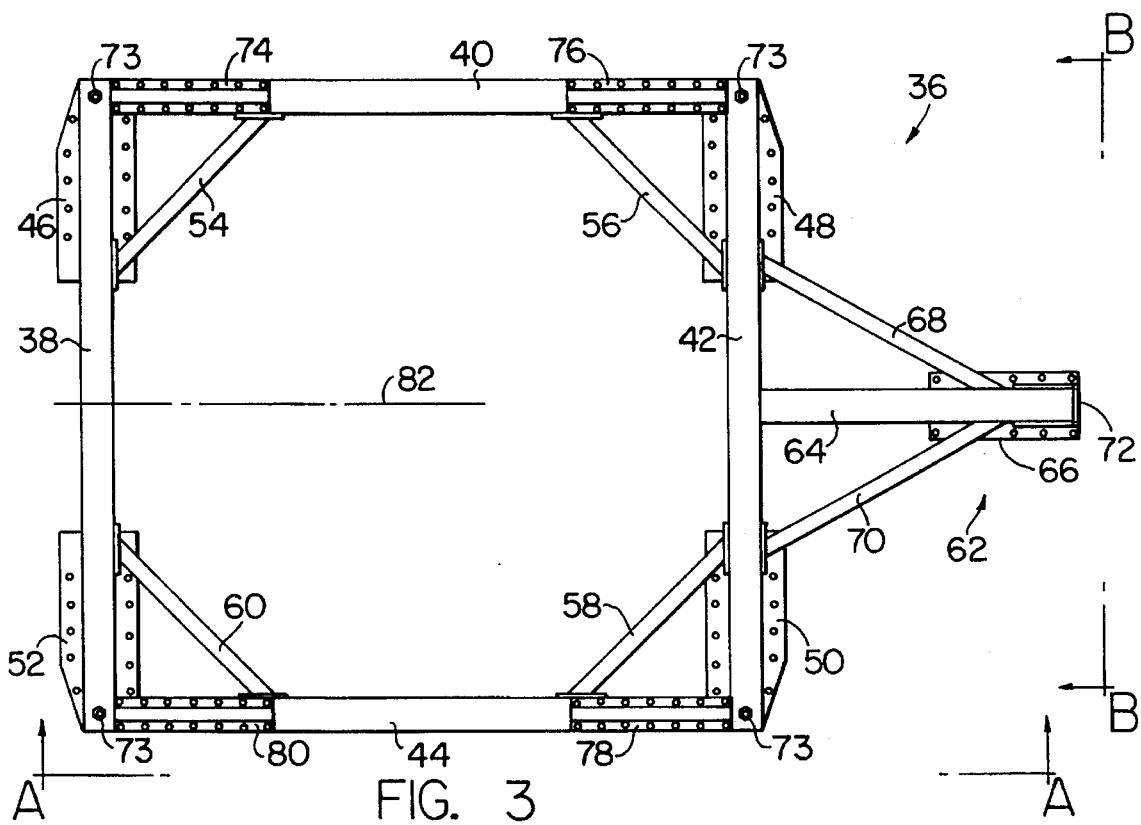
FIG. 3 is a simplified top view of a base frame of the motion base of FIG. 1.

FIGS. 3-5 present a simplified illustration of a base frame 36. The base frame acts as a foundation for the motion base and is affixed to the floor or other immovable portion of the simulator system. The base frame is comprised of a plurality of rectangular tube members 38-44 which form the perimeter of the base frame. At each corner there are footing plates 46-52 which are used to bolt the frame to the floor.

Rectangular tube elements 54-60 are used as corner braces to keep the structure rectangular. These braces are preferably bolted to the members 38-44. Extending off member 42 is an actuator support structure 62 comprised of an actuator mount 64 positioned to be substantially perpendicular to the member 42. A footing plate 66 is welded to the actuator support and is bolted to the floor. There are braces 68, 70 which are affixed to member 42 as well as the actuator mount itself. A heel plate 72 is also included for receiving one end of the actuator, not shown in the figure.

The base frame is characterized by a mortice and tenon configuration to affix the base frame members to each other. As shown in the figures, a tenon of member 40 is received in a mortice in member 38. The members are fastened together by means of pin 73, preferably two and one half inches in diameter. As detailed hereinafter, this structure allows for slight movement between members of the frame and provides substantial benefits to the other moving components of the motion base by reducing the loads imparted thereto. On an upper surface of base frame members 40 and 44, there are bearing rails 74-80, preferably bolted to the frame member which allow for a complimentary bearing rail component (e.g., pillow blocks) to be received and accommodate motion by a middle frame member along an X axis 82. FIGS. 4 and 5 are simplified elevational views taken along the section lines AA and BB, respectively.

Figure 6:
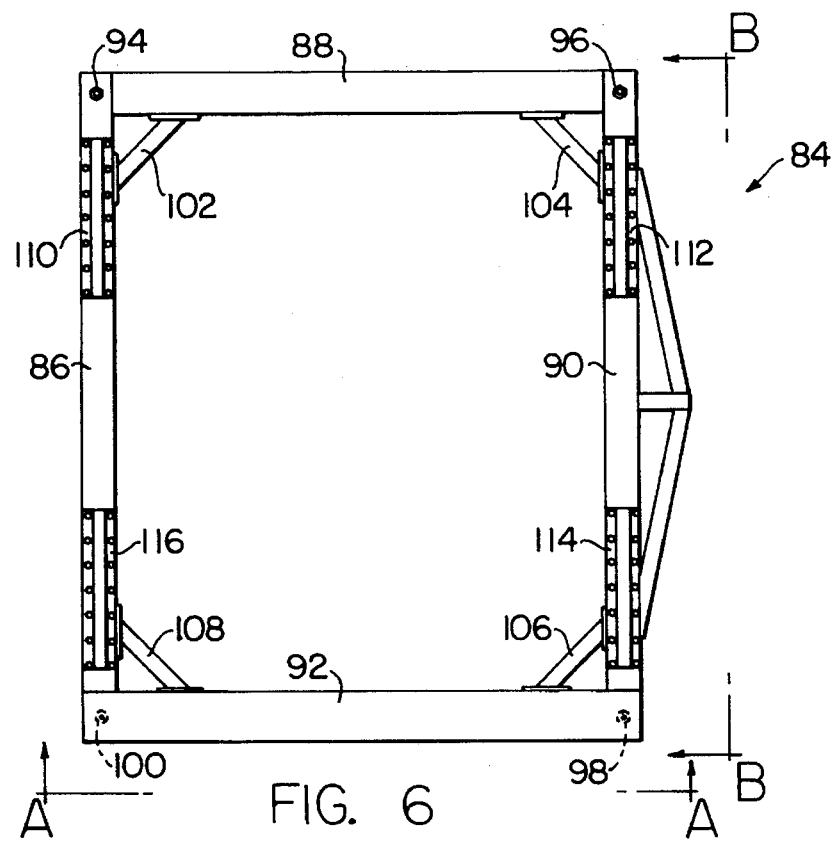
FIG. 6 is a simplified top view of a middle frame of the motion base of FIG. 1.

FIGS. 6-8 illustrate a middle frame member 84 that is received by the base frame. FIG. 6 is a top view of the middle frame, while FIGS. 7 and 8 respectively illustrate elevational views taken along section lines AA and BB. The middle frame is similar in design to the base frame in that it employs a mortice and tenon structure whereby members 86-92 are held in place by pins 94-100 in each corner. There are also corner braces 102-108 which are attached to appropriate locations in the respective middle frame members.

Along an upper surface of members 86 and 90 there are bearing rails 110-116 which are bolted or otherwise attached for allowing for movement of an upper frame along a Y axis. Similar to the bearing rails shown in FIGS. 3-5, the bearing rails 110-116 are adapted to receive a corresponding bearing rod to allow for movement of the upper frame along the Y axis.

Figure 9:
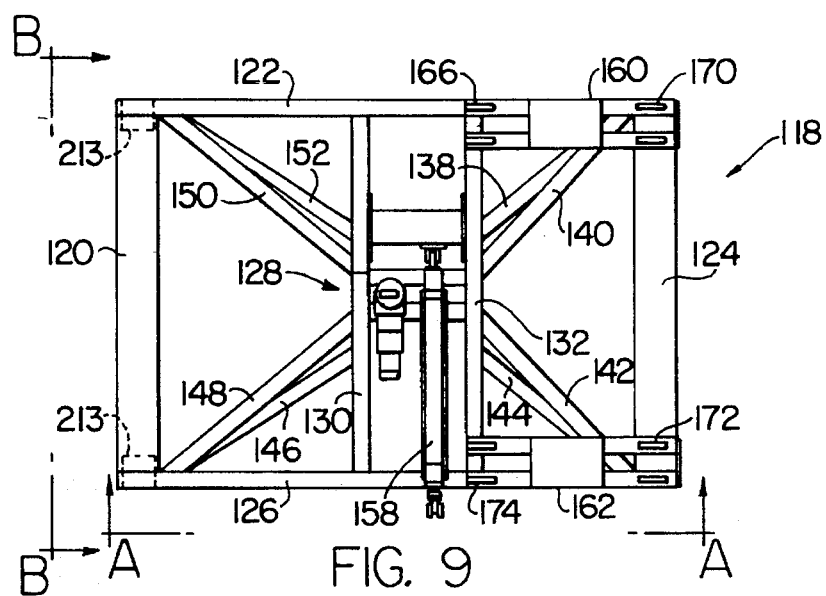
FIG. 9 is simplified top view of an upper frame of the motion base of FIG. 1.
Figure 10:
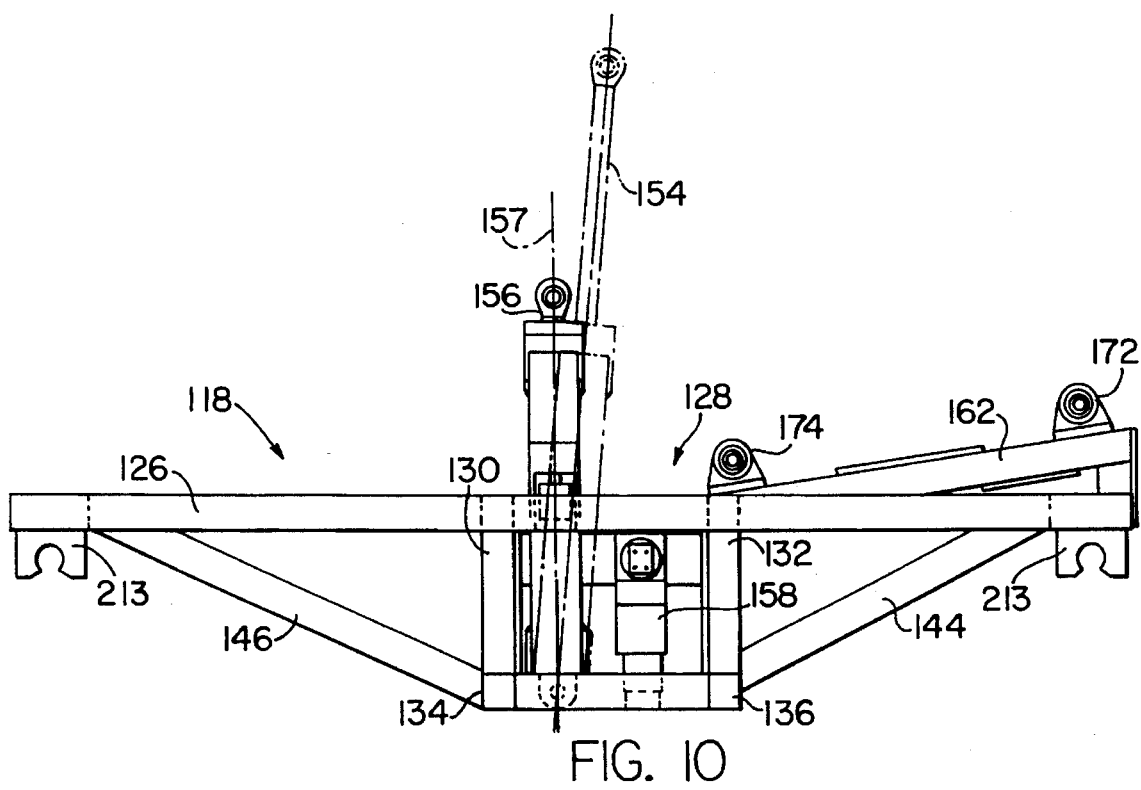
FIG. 10 is a simplified elevational view of the middle frame taken along the line A—A of FIG. 9.

Referring now to FIGS. 9-11, there is shown a simplified illustration of an upper frame 118 provided according to the present invention. FIG. 9 represents a top view, while FIGS. 10 and 11 respectively illustrate views along section lines AA and BB. The upper frame is comprised of outer perimeter members 120-126 which are welded to form a rigid substantially planar structure. There is a central carriage assembly 128 formed by members 130-136 which are configured to be substantially rectangular in shape. The carriage assembly is centrally located within the perimeter of the upper frame, with members 130 and 132 in substantial registration with the perimeter plane. Extending from an outer surface of the central carriage assembly are frame braces 138-152 which are received at corresponding locations in the upper frame perimeter members.

The central carriage assembly is configured to receive actuators for two of the three axes of movement of the motion base. The Z axis actuator extends upward from the bottom portion of the carriage assembly through the perimeter frame plane. FIG. 10 shows the Z actuator in fully extended 154 and fully compressed 156 positions along displacement axis 157. The Y axis actuator 158 is received within the carriage assembly.

The upper frame also comprises first and second angled elements 160, 162 which are received by an end of the upper frame perimeter member 124 so that the outermost portion of the angled elements are substantially in registration therewith and are at a elevated position relative to their respective interior ends. There are receptacles 168-174 affixed to an upper surface of the angled elements for receiving an engaging element of a stabilizer, as detailed hereinafter.

Figure 13:
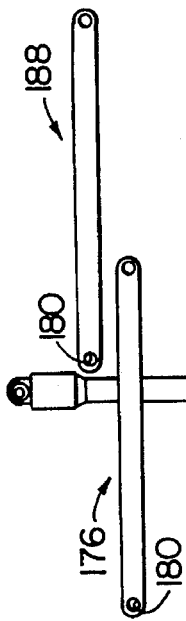
FIG. 13 is an elevational view of a stabilizer assembly as found in the motion base of FIG. 1.
Figure 12:
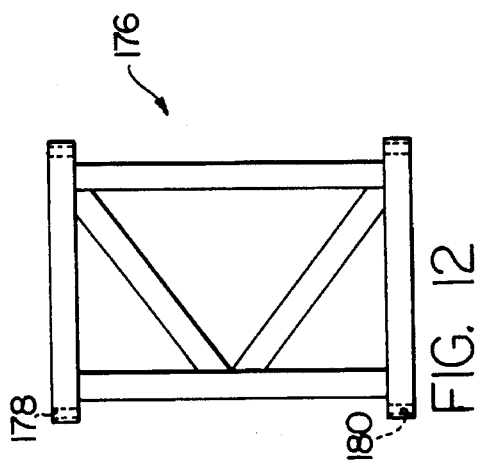
FIG. 12 is a simplified top view of a stabilizer of the motion base of FIG. 1.

FIG. 12 provides a top view of a stabilizer 176 used with the motion base of the present invention. Two stabilizers are used with the preferred embodiment. Each stabilizer has engaging elements 178, 180 to be received by the corresponding one of the upper frame assembly receptacle. There are also similar engaging elements 182, 184 which are received by corresponding receptacles in a lift carriage 186 shown in FIGS. 14–15. The stabilizers move in conjunction with the lift carriage and provide a lateral stability during vertical lift maneuvers. An elevational view of stabilizers 176 and 188 are shown in FIG. 13 in a fully compressed position in comparison to the vertical actuator.

Figure 14:
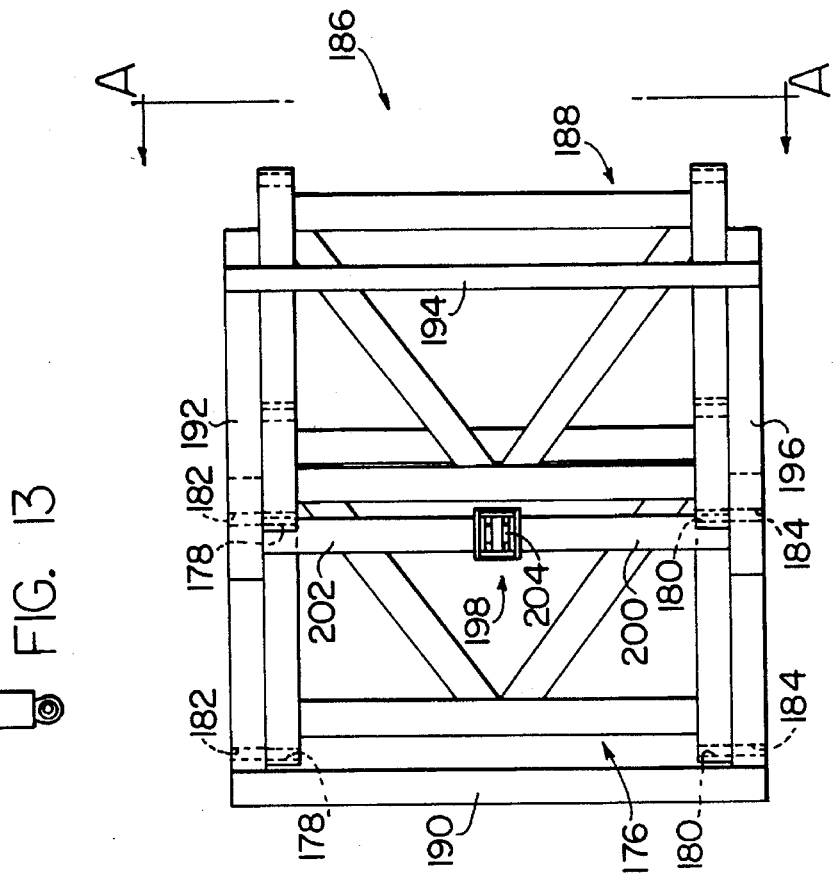
FIG. 14 is a top view of a lift carriage of the motion base of FIG. 1.
Figure 15:
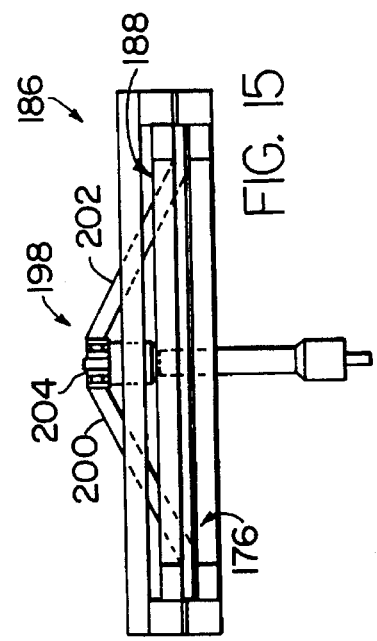
FIG. 15 is a simplified elevational view of the lift carriage of FIG. 14 taken along the line A—A.

FIGS. 14 and 15 provides an illustration of the lift carriage 186 provided in accordance with the present invention. The lift carriage is comprised of perimeter members 190–196 which are preferably welded together to form a rigid structure. There is also a central assembly 198 comprised of upwardly extending tubular elements 200, 202 which are joined to a central receiving element 204. The Z or vertical actuator is received in the element 204 by a heel plate. In FIG. 14, the stabilizers can also be seen. However, the receptacles for the stabilizers cannot.

Figure 16:
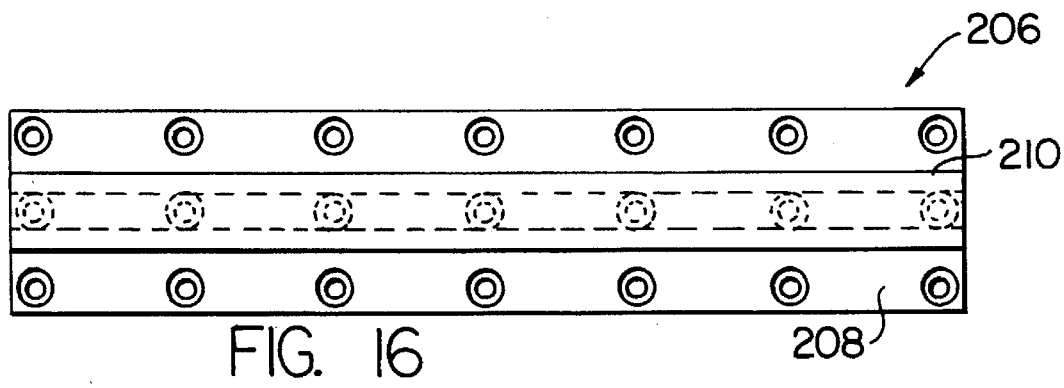
FIG. 16 is a top view of a bearing rail as used with the motion base of FIG. 1.
Figure 17:
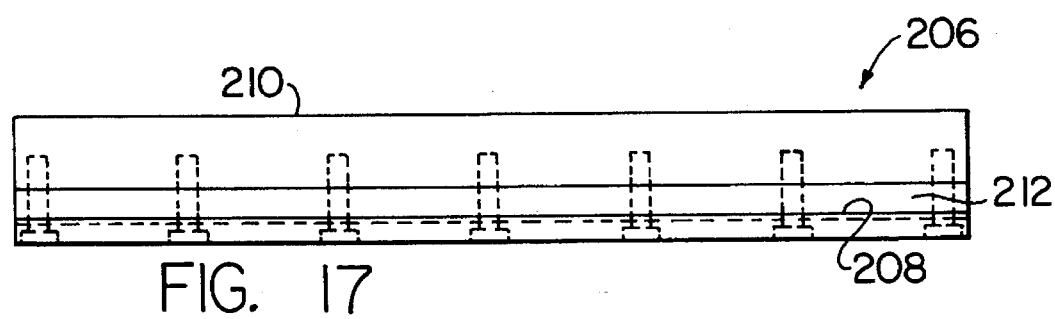
FIG. 17 is a side elevational view of the bearing rail of FIG. 16.
Figure 18:
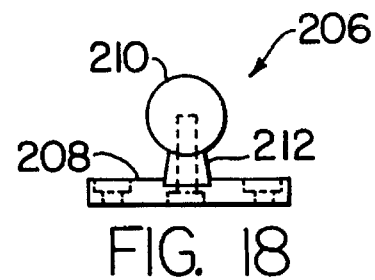
FIG. 18 is an end view of the bearing rail of FIG. 16 assembled with a rod and saddle.

FIGS. 16–18 illustrate a portion of a linear bearing assembly 206 providing according to the present invention. A bearing rail 208 is shown in top view in FIG. 16 and in an elevational view in FIG. 17. FIG. 18 provides an end view of the rail which shows a bearing rod 210 fixed to a saddle 212 which are bolted to the rail and, in turn, the bearing assembly is bolted to the corresponding member of the frame. The bearing assembly also comprises a pillow block 213 visible in FIG. 10 which receives the rod and allows for translation along the longitudinal axis.

Figure 19:
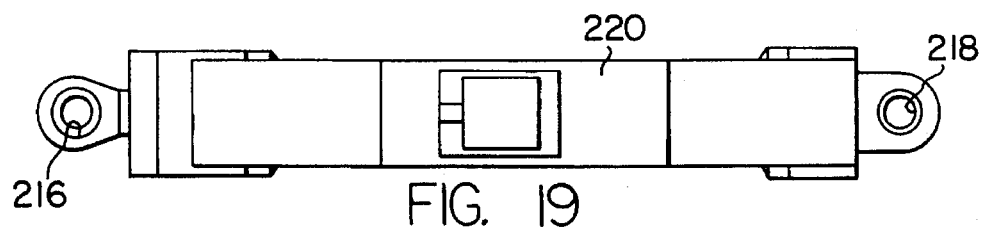
FIG. 19 is a top view of a vertical actuator used with the motion base of FIG. 1.
Figure 20:
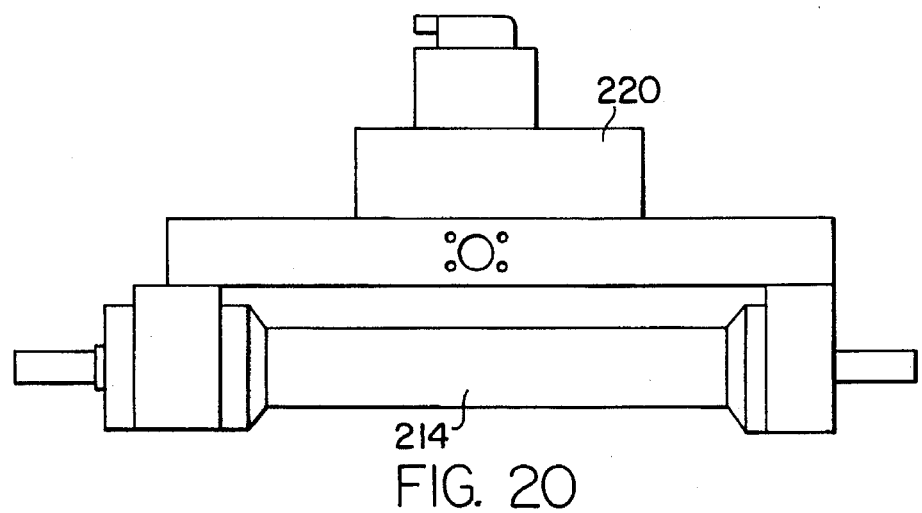
FIG. 20 is a side view of the vertical actuator of FIG. 19.

FIGS. 19 and 20 show a Z lift or vertical actuator 214 used with the present invention. The actuator is of a conventional design, but is characterized by spherical bearings 216, 218 at both ends of the actuator. These bearings are received by appropriate bearing mounts in the lift carriage and upper frame. The spherical bearings allow for a maximum degree of movement so that the structure is less subject to binding. The elevational view of FIG. 20 also shows a portion of the hydraulics 220 needed for actuator performance.

Figure 21:
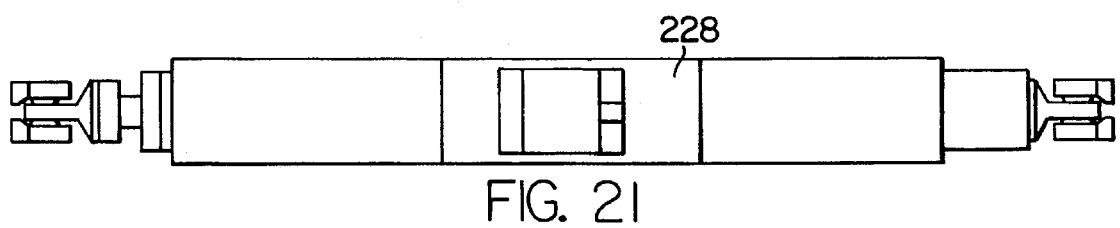
FIG. 21 is a top view of a horizontal actuator used with the motion base of FIG. 1.
Figure 22:
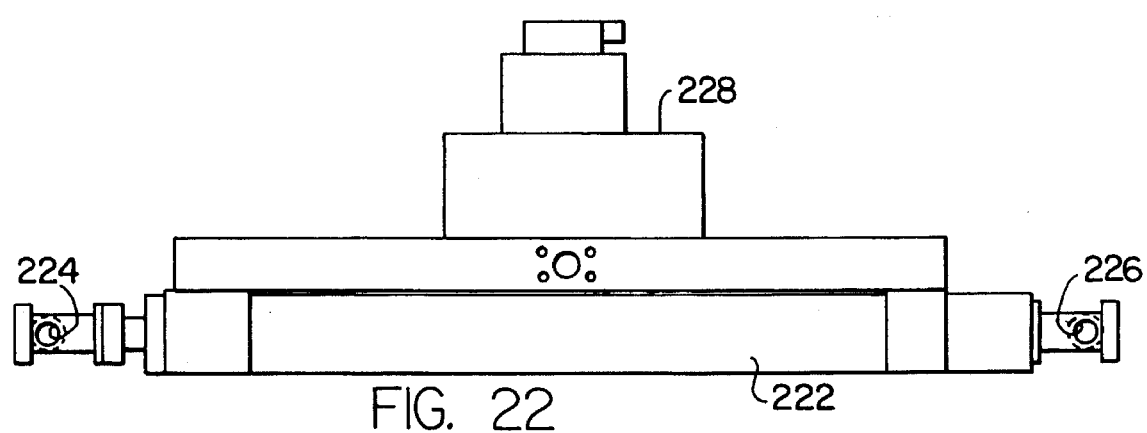
FIG. 22 is a side view of the horizontal actuator of FIG. 21.

FIGS. 21 and 22 show an actuator 222 used for the X and Y movement accomplished by the present motion base. The actuator is conventional in design, but is characterized by bearings 224, 226 on both ends which each provides degrees of freedom. Here as in the actuators of FIGS. 19 and 20, the additional freedom of movement allows for compliance needed to prevent destructive strains being transmitted to the bearing assemblies. A portion of the hydraulics 228 needed for operation is also visible in the figures.

Prior art orthogonal motion bases have been characterized by a welded construction. These motion bases included several parameter frames which were welded to be as rigid as possible, given the desire to minimize the displaceable weight and thereby minimize the hydraulic and electronic component requirements. These systems also used precision linear bearings which require that the bearing components be aligned to within 1/1000 of an inch.

However, the operational history of these prior art orthogonal motion bases have displayed several disturbing tendencies. Many of welds, especially at the joints between the members which comprise the perimeter frame structure, have developed severe cracks after only a short time in service. In addition, the linear bearings displayed extremely short useful life. The replacement costs are quite high, given the need to disassembly the entire structure in order to replace the bearing assemblies.

In addition, the attachment design for the actuators of the prior art orthogonal motion bases was selected to constrain the actuator to strictly linear motion. There was no possibility for any movement other than that provided by the displacement vector. However, the combination of the above-mentioned restrictions on movement have resulted in motion bases with very high incidences of failure and large expenditures needed to operate and maintain the motion bases in an actual simulator system environment.

In contrast, the present motion base provides for compliance at certain key locations. The effect of this additional compliance is to allow for slight movement of perimeter members and rotation of the actuator and with respect to those motion base frames, thereby reducing the stresses induced at critical points in the motion base.

For example, the base frame and middle frame are fabricated using a mortice and tenon design, with the frame members being held in place by a pin that is preferably 2½ inches in diameter and braces being bolted to the adjacent members. This configuration allows for a slight deflection between the frame members by as much as 1/16th of an inch. The horizontal plane actuator ends have frame mounts that incorporate two degrees of freedom (2 DOF) bearings, thereby allowing for 2° of relative movement in a vertical motion and 7° of lateral side to side movement from the motion axis. A combination of these components reduces the side loads which are impressed on the bearing rod. In the present motion base, the preferred embodiment employs a vertical actuator which has spherical bearings at both ends. This allows for maximum compliance and seriously decreases the undesired loads induced in the frames, thereby contributing to the improved bearing life which characterizes the present motion base.

Unlike some prior art motion bases, the present system avoids the use of any mechanical advantage in moving one or more of the frames. It has been shown that, for example, a two to one mechanical advantage in generating a lift or displacement results in a two to one mechanical disadvantage when receiving the loads induced by the motion base in operation. The present system is still characterized by a reduced overall height of less than 14.5 feet, enabling it to be used in existing buildings without the expenses mandated by taller designs.

The present invention is also characterized by an inboard mounted lateral actuator. In the present system, a Y axis actuator is nestled in the upper frame as shown in FIGS. 9–11. This feature allows for a significantly reduced footprint for the overall motion base. Prior art orthogonal motion bases which use a nested frame configuration require approximately 30 ft×30 ft footprint for a simulator system which has a 30" actuator throw. In contrast, the present system will fit within a 26 ft×26 ft footprint for a similar motion base having the same 30 inch throw and seating 15 to 18 individuals.

Another feature of the present invention can be seen with respect to FIG. 2. The ride car mounts to the lift carriage and contains the seats for the simulator system occupants. In the present system, the ride car incorporates removable seat boxes affixed by bolts which maximizes the flexibility in seating configuration. The preferred embodiment will provide seating for up to 18 individuals; an increase of three seats over prior art motion bases which have substantially the same overall dimensions and system requirements. Therefore, the present motion base will allow for a 20% increase in seating capacity with only a nominal increase in loads on the structure. Given the improved load bearing capacities of the present motion base, the motion base will display a vastly increased bearing life as well as an increase in the life of the welded joints.

The present system is also characterized by critical welds being fully penetrated to backing plates in order to ensure the maximum strength. The motion base frames are also normalized by process in which they are baked at 600° Fahrenheit for approximately 24 hours. This normalization process is used to remove stress in the frame which may remain after the welding process.

Similarly, although the invention has been shown and described with respect to a preferred embodiment thereof, it would be understood by those skilled in the art that other various changes, omissions and additions thereto maybe made without departing from the spirit and scope of the present invention. Although the displacement mechanisms are shown to be cooperative rails, those skilled in the art will note that other, equivalent means may be substituted including track or rack and pinion mechanisms. Similarly, other means of actuation, such as electromagnetic motors or pneumatic cylinders may be substituted with appropriate conventional modification to the system's hardware and software.

We claim:

1. A motion base for use with a simulator system having a system controller that generates command signals for presentation of a sequence of audio-visual image signals to a simulator system passenger synchronously with the movement of the motion base, said motion base comprising:

a base frame fixed to provide a foundation to the room floor, said base frame having a perimeter formed by base frame members affixed to one another by means of a mortice in a first member received by a complimentary tenon in a second member, with opposed ones of said base members having substantially parallel upper surfaces;

a middle frame positioned relative to said base frame to be displaceable along a first axis, said middle frame having a perimeter formed by middle frame members affixed to one another by means of a mortice in a first member received by a complimentary tenon in a second member, with opposed ones of said middle frame members having substantially parallel upper and lower surfaces;

cooperatively engaging base and middle displacement guide elements respectively affixed to said base frame upper surface and said middle frame lower surface for constraining said base and middle frames to linear relative movement along said first axis;

first actuator means communicating with said base and middle displacement guide elements for effecting displacement of said middle frame relative to said base frame in response to received first actuator drive signals;

a upper frame positioned relative to said middle frame to be displaceable along a second axis, said upper frame having a perimeter formed by upper frame members affixed to one another with opposed ones of said middle frame members having substantially parallel lower surfaces;

an actuator carriage affixed to a central region of said upper frame;

an elevated stabilizer mount affixed to said upper frame members such that stabilizer receptacles mounted on an upper stabilizer mount surface are inclined with respect to said upper frame perimeter;

cooperatively engaging middle and upper displacement guide elements respectively affixed to said middle frame member upper surfaces and said upper frame member lower surfaces for constraining said middle and upper frames to linear relative movement along said second axis;

second actuator means communicating with said middle and upper displacement guide elements for effecting displacement of said middle and upper frames relative to one another in response to received second actuator drive signals;

a lift carriage positioned relative to said upper frame to be displaceable substantially along a third axis orthogonal to both said first and second axes, and having stabilizer receptacles mounted on a lift carriage lower surface;

a third actuator means communicating with said upper frame and lift carriage displacement guide elements for effecting displacement of said lift carriage relative to said upper frame in response to received third actuator drive signals, said third actuator having a first end affixed to said actuator carriage; and a stabilizer rotably mounted in said stabilizer receptacles for providing lateral stability to said lift carriage during displacement.

2. The motion base of claim 1 wherein said lift carriage has an upper surface and said motion base further comprises a vehicle having a seat for said passenger and a mounting means to receive said lift carriage upper surface.

3. The motion base of claim 1 further comprising a second actuator internal mounting means for locating said second actuator within an actuator carriage an interior cavity.

4. The motion base of claim 1 further comprising base and middle frame braces, each of said braces being removably affixed to adjacent ones of said base frame and middle frame members.

5. The motion base of claim 1 further comprising a plurality of tenon pins to be received by each of said base and middle frame tenons.

6. The motion base of claim 1 wherein said cooperatively engaging displacement guide elements further comprise a linear bearing assembly including a cylindrical rod mounted to a saddle on a bearing rail and including a complementary pillow block adapted to receive said cylindrical rod.

7. The motion base of claim 1 further comprising:

a motion base controller for generating said actuator drive signals in response to received command signals; and a system controller for providing said command signals to said motion base controller in synchronization with the presentation of said audio signals and said visual images.

8. The motion base of claim 1 wherein said actuator means comprises hydraulic actuators.

9. The motion base of claim 1 wherein said actuator means comprises electric motors.

10. The motion base of claim 1 wherein said upper frame and said lift carriage are welded and wherein each of said welds is fully penetrated to a backing plate.

11. The motion base of claim 1 wherein said lift carriage further comprises an upper vertical actuator mount having upwardly extending first and second lateral members received by a centrally located actuator heel plate, said upper vertical actuator mount receiving an upper end of said third actuator.

12. The motion base of claim 1 wherein said first and second actuators further comprise two degree of freedom (2 DOF) bearings received on both ends of said actuators.

13. The motion base of claim 1 wherein said third actuator further comprise spherical bearings received on both ends of said actuator.

14. A simulator system for use in providing an event simulation to an passenger thereof, said simulator system comprising:

- a base frame fixed to provide a foundation to the room floor, said base frame having a perimeter formed by base frame members affixed to one another by means of a mortice in a first member received by a complimentary tenon in a second member, with opposed ones of said base members having substantially parallel upper surfaces;
- a middle frame positioned relative to said base frame to be displaceable along a first axis, said middle frame having a perimeter formed by middle frame members affixed to one another by means of a mortice in a first member received by a complimentary tenon in a second member, with opposed ones of said middle frame members having substantially parallel upper and lower surfaces;
- cooperatively engaging base and middle displacement guide elements respectively affixed to said base frame upper surface and said middle frame lower surface for constraining said base and middle frames to linear relative movement along said first axis;
- first actuator means communicating with said base and middle displacement guide elements for effecting displacement of said middle frame relative to said base frame in response to received first actuator drive signals;
- a upper frame positioned relative to said middle frame to be displaceable along a second axis, said upper frame having a perimeter formed by upper frame members affixed to one another with opposed ones of said middle frame members having substantially parallel lower surfaces;
- an actuator carriage affixed to a central region of said upper frame;
- an elevated stabilizer mount affixed to said upper frame members such that stabilizer receptacles mounted on an upper stabilizer mount surface are inclined with respect to said upper frame perimeter;
- cooperatively engaging middle and upper displacement guide elements respectively affixed to said middle frame member upper surfaces and said upper frame member lower surfaces for constraining said middle and upper frames to linear relative movement along said second axis;
- second actuator means communicating with said middle and upper displacement guide elements for effecting displacement of said middle and upper frames relative to one another in response to received second actuator drive signals;
- a lift carriage positioned relative to said upper frame to be displaceable substantially along a third axis orthogonal to both said first and second axes, and having stabilizer receptacles mounted on a lift carriage lower surface;
- a third actuator means communicating with said upper frame and lift carriage displacement guide elements for effecting displacement of said lift carriage relative to said upper frame in response to received third actuator drive signals, said third actuator having a first end affixed to said actuator carriage;
- a stabilizer rotably mounted in said stabilizer receptacles for providing lateral stability to said lift carriage during displacement;
- an audio-visual display means for providing a sequence of audio and visual image signals to the simulator system passenger;
- a motion base controller for generating said actuator drive signals in response to received command signals; and
- a system controller for providing said command signals to said motion base controller in synchronization with the presentation of said audio-visual image signals.

15. The simulator system of claim 14 wherein said motion base controller further comprises a proportional-integral-derivative (PID) controller.

16. The simulator system of claim 14 further comprising feedback sensors configured with each of said actuators for providing, to said motion base controller, signals indicative of the measured displacement of said corresponding actuator.

* * * * *